(12) United States Patent
Calvanese Strinati

(10) Patent No.: US 8,111,624 B2
(45) Date of Patent: Feb. 7, 2012

(54) LINK ADAPTATION TELECOMMUNICATION SYSTEM

(75) Inventor: Emilio Calvanese Strinati, Grenoble (FR)

(73) Assignee: Commissariat a l'Energie Atomique, Paris Cedex (FR)

( * ) Notice: Subject to any disclaimer, the term of this patent is extended or adjusted under 35 U.S.C. 154(b) by 1030 days.

(21) Appl. No.: 12/004,084

(22) Filed: Dec. 18, 2007

(65) Prior Publication Data

US 2008/0214119 A1 Sep. 4, 2008

(30) Foreign Application Priority Data

Dec. 18, 2006 (FR) ...................................... 06 55599

(51) Int. Cl.
*G01R 31/08* (2006.01)
*G01F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .......................................... 370/241; 455/67

(58) Field of Classification Search .................... None
See application file for complete search history.

(56) References Cited

U.S. PATENT DOCUMENTS 7,525,909 B2 * 4/2009 Fan et al. ...................... 370/230
2005/0149835 A1 * 7/2005 Dacosta ......................... 714/794
2006/0083295 A1 * 4/2006 Ahmed et al. ................. 375/222
2006/0276217 A1 * 12/2006 Khojastepour et al. ....... 455/522

FOREIGN PATENT DOCUMENTS

EP        1 638 239        3/2006
EP        1638239 A1 * 3/2006

OTHER PUBLICATIONS

French Preliminary Search Report, FA 692795, FR 0655599, dated Sep. 13, 2007.
Biglieri, E, et al.: "Fading Channels: Information—Theoretic and Communications Aspects", IEEE Transactions on Information Theory, vol. 44, No. 6, Oct. 1998, pp. 2619-2692.
Cheng, J.F. et al.: "Adaptive Incremental Redundancy", IEEE, US, vol. 2, Oct. 6, 2003, pp. 737-741.
Strinati, E.C. et al.: "Performance Evaluation of Some Hybrid ARQ Schemes in IEEE 802.11a Networks", IEEE, US, vol. 4 of 4, Conf. 57, Apr. 22, 2003, pp. 2735-2739.

* cited by examiner

*Primary Examiner* — Xavier Szewai Wong
(74) *Attorney, Agent, or Firm* — Nixon Peabody LLP

(57) ABSTRACT

The invention relates to a wireless telecommunication system including a transmitter and a receiver, said transmitter being used to transmit data packets to the receiver, said receiver including error detection means (220) in order to detect if a received packet contains errors, and further comprising means of outage detection (225) in order to determine, in the event an error packet is detected, if the transmission channel between the transmitter and the receiver is in an outage situation and in order to transmit a first (OUTAGE) signal indicating this situation, the transmitter being used to modify the conditions of transmission in response to said first signal.

12 Claims, 2 Drawing Sheets

LINK ADAPTATION TELECOMMUNICATION SYSTEM

CROSS REFERENCE TO RELATED APPLICATIONS OR PRIORITY CLAIM

This application claims priority to French Patent Application No. 06 55599, filed Dec. 18, 2006.

DESCRIPTION

1. Technical Field

This invention relates to the field of wireless telecommunication systems and more particularly telecommunication systems with link adaptation.

2. Prior Art

In a wireless telecommunication system, the quality of the signal received by a terminal depends on a large number of factors. In order to maximise the transmission rate and the overall capacity of the system, the signal transmitted to and from a terminal is generally modified in order to take into account these variations in signal quality. This modification mechanism is known as link adaptation.

A well-known means to adapt a link in a wireless telecommunication system is to use AMC (Adaptive Modulation and Coding), in other words to select an MCS (Modulation and Coding Scheme) according to the quality of the channel. This means is in particular implemented in the physical layer of EDGE, HIPERLAN/2 or 3GPP systems. Typically, for a low signal to noise ratio on the transmission channel, a code with low efficiency is opted for (i.e. with a high redundancy rate) and/or a low degree of modulation (i.e. a modulation constellation of low size). Inversely, if the transmission channel has a high signal to noise ratio, the rate is maximised by choosing a code with high efficiency and a high degree of modulation. The signal to noise ratio (SNR) or signal to noise and interference ratio (SNIR) is determined by the receiver using the bit error rate or packet error rate.

A second means for adapting a wireless network, making it possible to combat channel fading over the transmission channel, is to make use of a hybrid automatic repeat request (HARQ) There are currently several versions of the HARQ protocol.

The simplest version, called HARQ Type I, combines the advantages of error correction or FEC (Forward Error Correction) and those of the conventional ARQ protocol by encoding a data block of information with an error detection code (CRC) and an error-correcting code (ECC). If a number of errors are detected such that the ECC code cannot correct them, a request to retransmit the error block is sent to the transmitter and a second transmission attempt takes place. In practice, the error block is not deleted but is stored in a buffer in order to be combined (Chase combining) with the block received during the second attempt. The result of the combination is submitted to the decoder.

A second version of the HARQ protocol, called HARQ Type II or IR HARQ (Incremental Redundancy HARQ) makes it possible to reduce the size of the packets retransmitted. According to this version, when the block is first transmitted, the code is punctured in such a way that few redundancy bits are transmitted. If the block received during the first transmission contains errors and cannot be corrected using the available redundancy bits, additional redundancy bits, eliminated during puncturing, are transmitted as a response to the first retransmission request. The process can repeat itself, with the redundancy bits being transmitted incrementally, as the retransmission requests take place, as long as the error block cannot be corrected.

Furthermore, the AMC adaptation scheme on the physical layer can be combined with a HARQ mechanism at the level of the link layer. This is referred to as a cross-layer adaptation mechanism (cross-layer design). In such a case, a first adaptation is carried on the physical layer thanks to the choice of code and of the modulation constellation according to the packet error rate, PER, measured by the receiver. A second and finer adaptation is carried out at the link layer level by sending retransmission requests. The cross-layer architecture makes it possible to reduce the number of MCS schemes of the AMC adaptation mechanism. An example of cross-layer adaptation can be found in the article by E. Calvanese Strinati et al. entitled "Performance evaluation of some hybrid ARQ schemes in IEEE 802.11a networks" published in Proceedings of the IEEE Vehicular Technology Conference, Spring, vol. 4, pages 2735-2739, April 2003.

Finally, other link adaptation mechanisms can be considered in a multi-access configuration, by using a dynamic allocation of access resources (scheduling), whether in terms of transmission power, transmission frequency transmission interval or even access codes in a CDMA system. This scheduling policy makes it possible for users, and more generally services, that require a higher service quality, to benefit from better quality transmission channels.

The aforementioned adaptation methods apply in particular to a wireless telecommunication system of which the radio channels are frequency selective. A frequency selective channel means a channel with a coherency bandwidth that is narrower than the bandwidth of the transmitted signal.

Most of these adaptation methods make use of measuring the packet error rate (PER) or bit error rate (BER) by the receiver in order to estimate the quality of the link. However, it occurs that the packet error rate is overestimated or on the contrary, more critically, underestimated. In the first case, the MCS scheme selected for the physical link will be more robust than needed, which will result in an under-use of the capacity of the channel. In the second case, the MCS scheme selected can turn out to be highly insufficient to allow for satisfactory transmission over the channel. This is referred to as catastrophic adaptation. For example, if the adaptation mechanism is of the HARQ type, we shall then have repeated retransmission requests that will severely penalise the transmission rate. This situation can last during the interval of time that separates two successive PER measurements, chosen generally less than the coherency time of the channel. The latter can however be relatively long in a WLAN and the prolonged lack of adaptation that results risks being incompatible with the Quality of Service constraint (QoS) imposed by the upper layers.

A catastrophic adaptation situation occurs frequently when the channel is not ergodic, for example if the channel if of block fading type. Indeed, in such a case, a data packet "sees" only a limited number of channel instances, each instance corresponding to one block of the packet. Selecting the MCS scheme is accomplished based on the prediction of the signal to noise ratio, using the error rate measured by the receiver. This prediction generally makes use of statistical tables obtained by taking an average of all the possible instances of the channel. As such, in practice, the MCS scheme selected for a frame has little chance of corresponding to the actual signal to noise ratio during the transmission of this frame, with the abovementioned risks of catastrophic adaptation.

The purpose of this invention is to provide a wireless telecommunication system able to detect and overcome a catastrophic adaptation situation for a non-ergodic channel.

DESCRIPTION OF THE INVENTION

The invention is defined by a wireless telecommunication system including a transmitter and a receiver, said transmitter being used to transmit data packets to a receiver, said receiver including error detection means in order to detect if a received packet contains errors, wherein said receiver further includes means of outage detection in order to determine, in the event an error packet is detected, if the transmission channel between the transmitter and the receiver is in an outage situation and in order to transmit a first signal indicating this situation, the transmitter being used to modify the conditions of transmission in response to said first signal.

Advantageously, the outage situation is established when the instantaneous mutual information of the channel is greater than the transmission bit-rate.

Each packet being divided into blocks and each block corresponding to an instance of the channel, instantaneous mutual information of the channel is calculated as the average mutual information on the blocks of a packet.

The transmission bit-rate is calculated as $$R = \frac{k}{n}\log Q$$

where k and n are respectively the dimension and the length of the error-correcting code coding said data and Q is the degree of the symbol binary modulation used to transmit said data.

According to a first alternative, the transmitter is used to select the most robust modulation and coding scheme from amongst a plurality of available schemes, when the channel is in an outage situation.

According to a second alternative, the transmitter uses an access resource from amongst a plurality of access resources to transmit said data to the receiver and it selects a new access resource from amongst said plurality when the channel is in an outage situation.

Said access resources are transmission frequencies, transmission time intervals, orthogonal codes or combinations of these resources.

Advantageously, said error detection means are used to transmit a second signal in order to acknowledge the proper reception or indicate defective reception according to whether or not the received packet contains errors.

If the second signal indicates defective reception, the transmitter is advantageously used:

to retransmit said error packet with the same modulation and coding scheme with which it was previously transmitted, if the channel is not in an outage situation; and to select the most robust modulation and coding scheme from amongst a plurality of available schemes, and to retransmit said error packet with the scheme selected in this way, when the channel is in an outage situation.

Alternatively, if the second signal indicates a defective reception, the transmitter is used to transmit:

some of the redundancy bits eliminated during a puncturing step of the error-correcting code that was used to code said packet during the preceding transmission, if the channel is not in an outage situation;

all of the redundancy bits eliminated during a puncturing step of the error-correcting code that was used to code said packet during the preceding transmission, if the channel is in an outage situation.

The invention also relates to a receiver for a wireless telecommunication system, said receiver including error detection means in order to detect if a packet received from a transmitter contains errors, said receiver further comprising means of outage detection in order to determine, in the event an error packet is detected, if the transmission channel between the transmitter and the receiver is in an outage situation and in order to transmit to the transmitter a first signal indicating this situation.

Advantageously, said means of outage detection detects an outage situation if the instantaneous mutual information of the channel is greater than the transmission bit-rate.

Each packet being divided into blocks and each block corresponding to an instance of the channel, said outage detection means calculate the instantaneous mutual information as the average mutual information on the blocks of a packet.

The transmission bit-rate is obtained as $$R = \frac{k}{n}\log Q$$

where k and n are respectively the dimension and the length of the error-correcting code coding said data and Q is the degree of the symbol binary modulation used to transmit said data.

Advantageously, said means of outage detection estimate the instantaneous mutual information using:

$$I_{inst} = \frac{\gamma}{n_c}\sum_{i=1}^{n_c} |h_i|^2$$

where $\gamma$ is the signal to noise ratio, $n_c$ the number of blocks in a packet and $h_i$, $i=1 \ldots n_c$ the attenuation coefficients of the transmission channel affecting respectively the blocks of said packet.

Alternatively, said means of outage detection estimate the instantaneous mutual information using:

$$I_{inst} = \frac{1}{n_c}\sum_{i=1}^{n_c} I_i$$

with $$I_i = \log Q - \frac{1}{Q}\sum_{k=1}^{Q} E_z\left\{\log\left(\sum_{q=1}^{Q} \exp\left[-\frac{|h_i a_k + z - h_i a_q|^2 - |z|^2}{2\sigma^2}\right]\right)\right\}$$

where the $\alpha_q$, $q=1, \ldots, Q$ are the symbols of the modulation alphabet, $n_c$ is the number of blocks in a packet, $h_i$, $i=1, \ldots n_c$ are the attenuation coefficients of the transmission channel affecting respectively the blocks of said packet, $z=N(0,\sigma^2)$ the random variable describing the noise and $E_z(.)$ is the expected value over the noise samples.

BRIEF DESCRIPTION OF THE DRAWINGS

Other characteristics and advantages of the invention shall appear when reading a preferred embodiment of the invention in reference to the attached figures amongst which.

DETAILED DESCRIPTION OF PARTICULAR EMBODIMENTS

Figure 1:
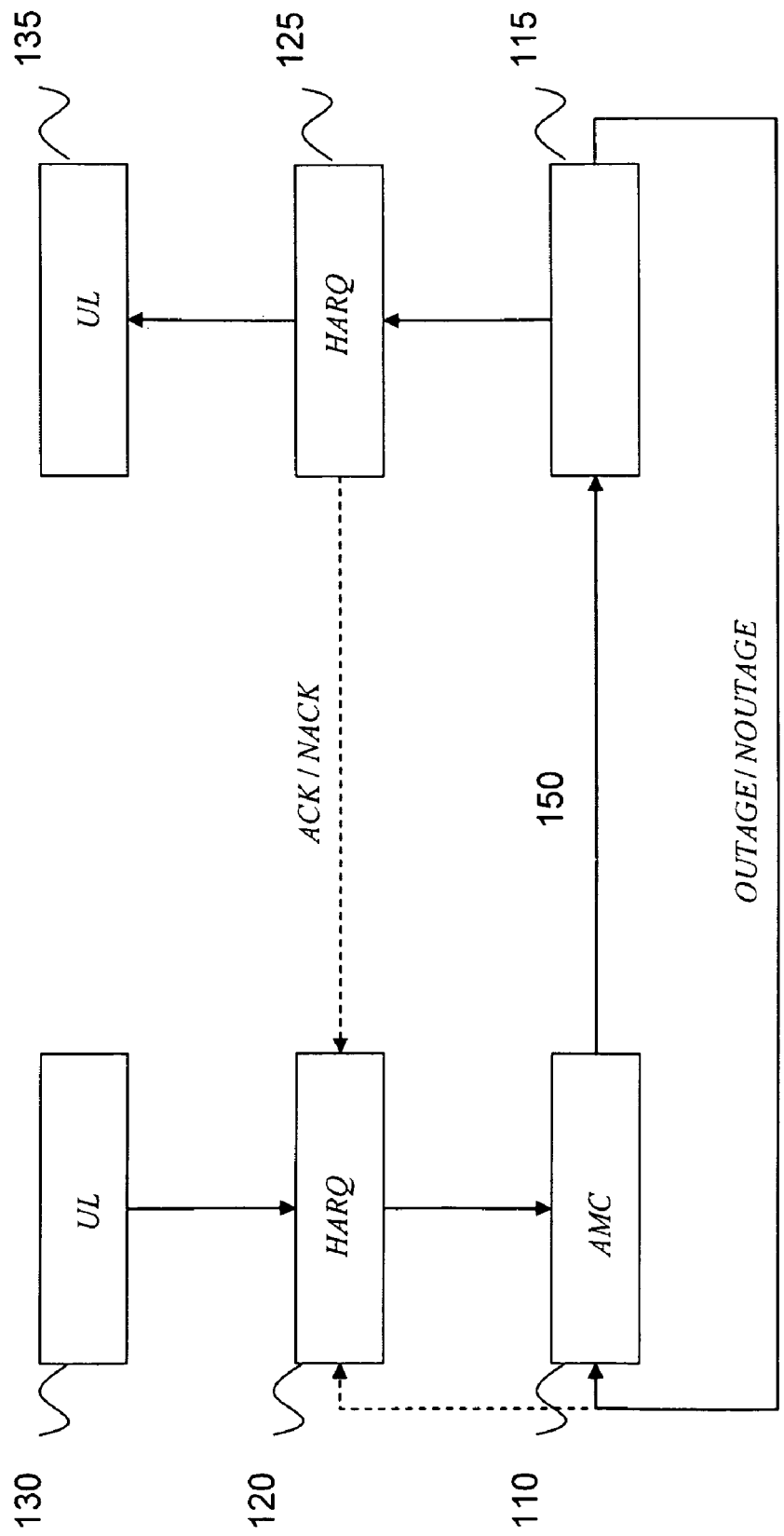
FIG. 1 schematically shows the operation of a wireless telecommunication system according to an embodiment of the invention.

We shall consider in what follows a wireless telecommunication system transmitting on a non-ergodic channel, for example a block fading channel. Without loss of generality, we shall suppose that the system transmits data packets on this channel, each packet being schematically divided into $n_c$ blocks, each block corresponding to one instance of the channel. A channel instance is characterised by a complex value of an attenuation coefficient. The partitioning of the packet into blocks does not prejudge the manner in which the bits are transmitted. As such a block could correspond to a set of contiguous carriers of an OFDM symbol or to a time interval: in the first case the response of the channel is constant by spectral bands, in the second by time intervals. A block could also be defined jointly by a spectral band and a time interval.

The coefficients can be understood as the result of $n_c$ drawings of a random variable, for example having a Rayleigh distribution. We shall note h as the vector of the attenuation coefficients $h_i$, $i=1, \ldots, n_c$.

The capacity in the sense of Shannon, expressed as the average of the mutual information over all the instances of the channel, is not of pertinent magnitude to characterise a non-ergodic channel. As indicated in the article by E. Bigileri et al. entitled "Fading channels: information-theoretic and communication aspects" published in IEEE Trans. on Information Theory, vol. 44, n° 6, October 1998, pages 2619-2692, it is therefore preferable to characterise this channel by an outage probability. There is an outage when the capacity associated with the instance of the channel is less than the transmission bit rate of the source.

The outage probability depends on the signal to noise ratio γ and the transmission bit rate R of the source, i.e.:

$$P_{out}(\gamma, R) = Pr(I(X,Y) < R) \quad (1)$$

For example, for an error-correcting code (n, k, $d_{min}$) and a binary to symbol modulation alphabet of cardinal number Q, the transmission bit rate is $$R = \frac{k}{n} \log Q.$$

Recall that a code noted conventionally (n, k, $d_{min}$) is a code of length n, dimension k and minimal distance, $d_{min}$. The quantity n−k indicates the degree of redundancy of the code.

The outage probability can be considered as the probability that the "instantaneous" mutual information of the channel, as seen by a packet, is less than the transmission bit rate. If the latter is less than this rate, it will not be possible to correct the errors affecting a packet. However, by drawing a parallel with Shannon's fundamental theorem, if the "instantaneous" mutual information of the channel is greater than this rate, it will always be possible to use an error-correcting code making it possible to transmit the data with an arbitrarily low probability of error.

The "instantaneous" mutual information of the channel, i.e., "observed" during the transmission of a packet, can be evaluated using:

$$I_{inst} = \frac{1}{n_c} \sum_{i=1}^{n_c} I_i \quad (2)$$

where $I_i$ is the average mutual information calculated over the block i. The behaviour of the channel over a block can be considered, roughly to the multiplication coefficient $h_i$, as being of the AWGN (Additive White Gaussian Noise) type.

With the receiver knowing the coefficients $h_i$ thanks to the detection of pilot symbols and the bit Q-ary symbol demodulator providing an estimation of the noise variance $\sigma^2$, it can be shown that the average mutual information $I_i$ is thus expressed by:

$$I_i = \log Q - \frac{1}{Q} \sum_{k=1}^{Q} E_z \left\{ \log \left( \sum_{q=1}^{Q} \exp\left[-\frac{|h_i a_k + z - h_i a_q|^2 - |z|^2}{2\sigma^2}\right] \right) \right\} \quad (3)$$

where the $\alpha_q$, $q=1, \ldots, Q$ are the symbols of the modulation alphabet, $z = N(0, \sigma^2)$ with the random variable describing the noise and $E_z(.)$ is the expected value over the noise samples.

Instead of estimating the "instantaneous" mutual information of the channel using (2) and (3), it is possible to evaluate it empirically by approaching it with:

$$I_{inst} = \frac{\gamma}{n_c} \sum_{i=1}^{n_c} |h_i|^2 \quad (4)$$

As already indicated above, if $I_{inst}$, such as obtained by (2) and (3), or (4) is less than the transmission rate R, the channel will be in an outage situation and the errors affecting the data of a frame will not all be in a position to be corrected.

The idea at the basis of the invention is to allow the receiver to diagnose an outage situation and to inform the transmitter of this, for example using a signalling bit. The transmitter will then take particular link adaptation measures in order to avoid a catastrophic adaptation situation.

According to a first embodiment, the receiver first calculates the CRC of the received packet and determines if the packet contains errors. If so, the receiver evaluates the "instantaneous" mutual information according to (2) and (3), or (4) for the packet and compares it with the transmission rate R. If an outage of the channel is diagnosed, the receiver informs the transmitter of this. The latter then adopts the most robust MCS scheme for the following transmission, i.e. the one that corresponds to the lowest transmission rate, $R_{min}$, expecting $I_{inst} > R_{min}$ to be verified for this transmission. In the absence of a channel outage, the receiver provides the transmitter with the current level of the signal to noise ratio and the latter uses a table to determine the most appropriate MCS scheme, according to a conventional AMC adaptation mechanism.

According to a second embodiment of the invention, the wireless telecommunication system implements an adaptation mechanism of the IR HARQ type.

The receiver determines if a received packet contains errors using a CRC calculation. If there is no error, the receiver transmits an acknowledgement signal ACK. If there is an error, the receiver transmits a negative acknowledgement NACK signal to the transmitter and verifies whether $$I_{inst} > \frac{k}{n_p} \log Q,$$

where $n_P$ is the number of bits of the punctured code. If the inequality is true, there is an outage of the channel. The transmitter then retransmits at once all of the bits eliminated during the puncturing step expecting $$I_{inst} > \frac{k}{n}\log Q$$

at the next transmission. However, if there is no outage, the redundancy bits are transmitted incrementally at each new retransmission request as with a conventional IR HARQ mechanism, in other words only some of the eliminated bits are transmitted at each request.

According to a third preferred embodiment of the invention, the wireless telecommunication system implements a cross-layer link adaptation mechanism.

The receiver first calculates the CRC of the received packet. If the packet does not have any errors, an acknowledgement signal ACK is transmitted to the transmitter in order to indicate the proper reception of the packet. However, if the packet contains errors, the receiver determines as previously, by comparison between the instantaneous mutual information $I_{inst}$ and the transmission rate R if the channel is in an outage situation. If this is effectively the case, it sends both a negative acknowledgement signal NACK and a channel outage signal OUTAGE to the transmitter. The transmitter then retransmits the packet in question by selecting the most robust MCS scheme, i.e. the one that corresponds to the lowest transmission rate, $R_{min}$ from amongst the available schemes.

However, if the channel is not in an outage situation, the receiver transmits the sufficient channel capacity signal NOUTAGE with that of negative acknowledgement NACK.

According to a first alternative (HARQ type I), the transmitter sends back the packet in question by using the same MCS scheme. The packets received successively are advantageously combined before they are sent to the decoder. The process can be reiterated in the event of failure.

According to a second alternative, the transmitter sends back the packet in question but with a more robust MCS scheme, i.e. a constellation with a lower degree of modulation, and/or lower coding rate, i.e. of higher redundancy. This process can be reiterated in the event of failure. In this way the transmission rate is reduced at each attempt.

According to a third alternative (HARQ type II), only some of the redundant bits eliminated by the puncturing step during the first transmission are emitted. If the errors cannot be corrected by the error-correcting code using these additional bits (without the channel however being in an outage situation) the process is reiterated as in a conventional IR HARQ scheme.

According to a fourth embodiment, the telecommunication system uses a dynamic allocation of access resources to the various users. These access resources can be frequencies, frequency bands, transmission intervals, orthogonal codes, or combinations thereof. A particular case of interest related to frequency bands as access resources concerns an OFDM telecommunication system. In such a system the access resources can be ranges of carrier frequencies of the OFDM frequency multiplex. For a given channel instance, some ranges of carrier frequencies may be affected by fading while other ranges are not affected by the same. If the receiver detects a packet with errors via the CRC and if it determines that the channel is in an outage situation, it transmits as previously a negative acknowledgement signal NACK as well as a channel outage signal OUTAGE. The transmitter, in practice the base station, allocates a new access resource to the user affected by the channel outage. The error packet can be retransmitted using the resource that was just allocated to the user or error recovery can be performed at a higher protocol level. The access resource corresponding to the channel in an outage situation can be reallocated later, where applicable after a safety timeout.

FIG. 1 schematically shows the operation of a telecommunication system according to an embodiment of the invention. References 110, 120, 130 respectively show the physical layer, link layer and an upper layer UL on the transmitter side. References 115, 125 and 135 indicate the same layers on the receiver side.

The transmitter transmits data packets over a non-ergodic channel 150, after AMC adaptive modulation and coding in 110.

The receiver receives in 115 said packets and, in the event error(s) are detected, tests if the channel is in an outage situation. The corresponding OUTAGE/NOUTAGE signal is transmitted to the transmitter. Furthermore in embodiments using an HARQ mechanism (second and third embodiments mentioned above), an acknowledgement/acknowledgement defect signal of the packet ACK/NACK is also sent to the transmitter.

Figure 2:
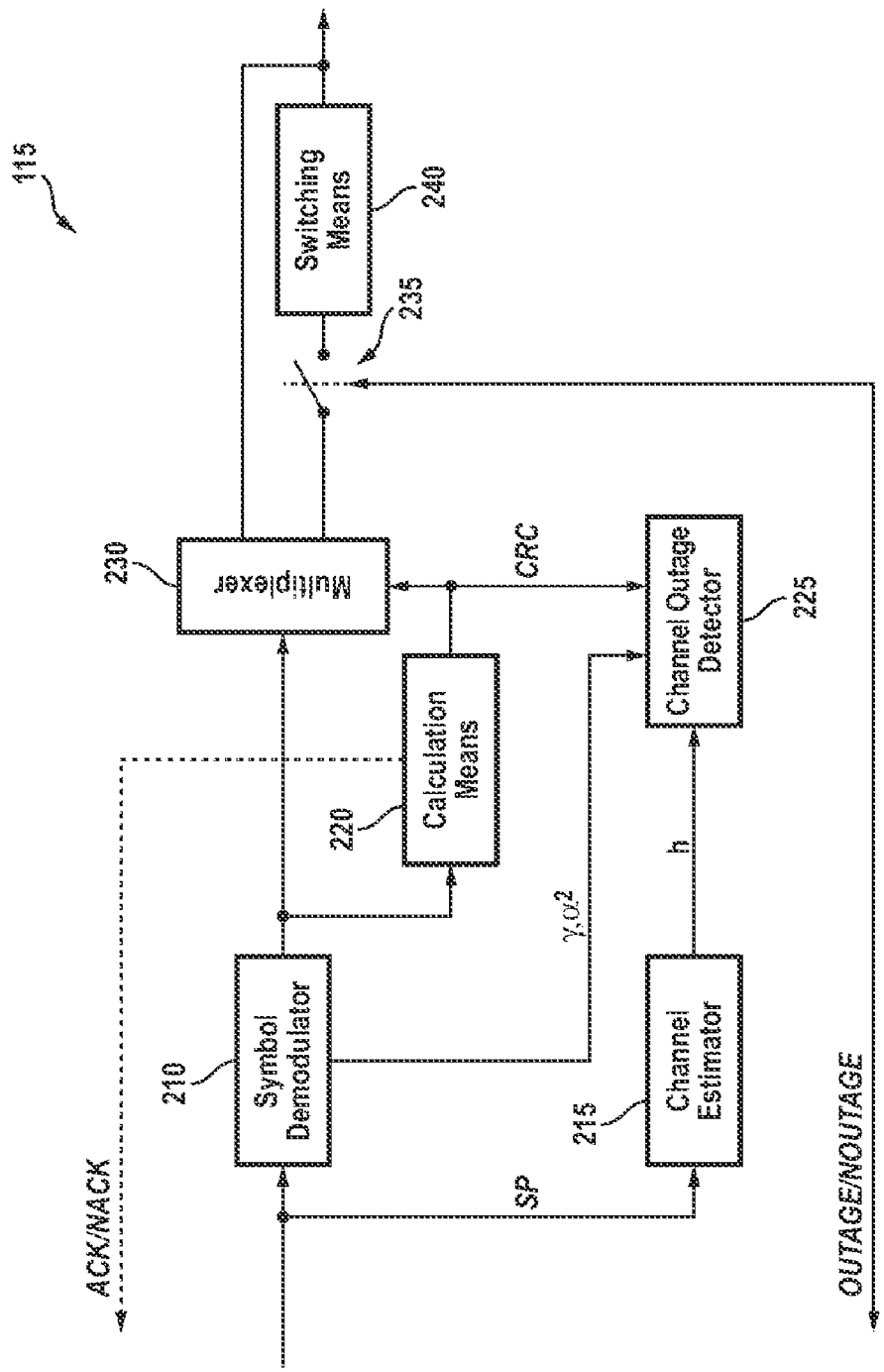
FIG. 2 schematically shows the structure of a receiver intended to be used in the telecommunication system of FIG. 1.

FIG. 2 schematically shows the structure of a receiver according to the invention intended to be used in the telecommunication system of FIG. 1.

The symbols received by the receiver 115 are demodulated in the binary symbol demodulator 210. The code word(s) comprising the data packet are then submitted to means of CRC calculation 220. These means determine if the packet contains errors and transmits this information to multiplexer 230 as well as to the means of channel outage detection 225. If the packet does not contain any errors, it is transmitted directly over the output. Otherwise, it is transmitted to switching means 235. The calculation means 220 also informs via a ACK/NACK signal whether or not the received packet contains errors.

The channel estimator 215 estimates the attenuation coefficients $h_i$ using pilot symbols SP and transmits them to means 225. The latter also receive from demodulator 210, the estimation of the signal to noise ratio γ and/or noise power $\sigma^2$ and calculates using the expressions (2) and (3) or (4) the average mutual information on the blocks of the packet, i.e. the "instantaneous" mutual information $I_{inst}$. Means 225 also know the MCS scheme used for the emission (for example using a signalling channel) and deduce the transmission bit rate R from this. The means 225 test if $R>I_{inst}$ and inform the transmitter via the OUTAGE/NOUTAGE signal. This same signal controls switching means 235. According to whether or not the channel is in an outage situation, the switching means inhibit or transmit the error packet to the ECC decoder. Thus the decoding operation will not be carried out unnecessarily, since in an outage situation, the latter would result in a failure.

The invention claimed is:

1. Wireless telecommunication system including a transmitter and a receiver, the transmitter being used to transmit data packets to a receiver, the receiver including error detection means in order to detect if a received packet contains errors, wherein the receiver further includes means of outage detection in order to determine, in the event an error packet is detected, if the transmission channel between the transmitter and the receiver is in an outage situation and in order to transmit a first (OUTAGE) signal indicating this situation, the transmitter being used to modify the conditions of transmission in response to the first signal, the outage condition being established when the instantaneous mutual information is lower than the transmission bit rate, said transmission bit rate being calculated as $$R = \frac{k}{n} \log Q$$

where k and n are respectively the dimension and the length of the error-correcting code coding said data and Q is the degree of the symbol binary modulation used to transmit said data.

2. Telecommunication system according to claim 1, wherein the transmission bit-rate is calculated as $$R = \frac{k}{n} \log Q$$

where k and n are respectively the dimension and the length of the error-correcting code coding the data and Q is the degree of the symbol binary modulation used to transmit the data.

3. Telecommunication system according to claim 1, wherein the transmitter is used to select the most robust modulation and coding scheme from amongst a plurality of available schemes, when the channel is in an outage situation.

4. Telecommunication system according to claim 1, wherein the transmitter uses an access resource from amongst a plurality of access resources to transmit the data to the receiver and in that it selects a new access resource from amongst the plurality when the channel is in an outage situation.

5. Telecommunication system according to claim 4, wherein the access resources are transmission frequencies, transmission time intervals, orthogonal codes or combinations of these resources.

6. Telecommunication system according to claim 1, wherein the error detection means are used to transmit a second signal (ACK/NACK) in order to acknowledge the proper reception or indicate defective reception according to whether or not the received packet contains errors.

7. Telecommunication system according to claim 6, wherein, if the second signal indicates defective reception,
the transmitter is used to retransmit the error packet with the same modulation and coding scheme with which it was previously transmitted, if the channel is not in an outage situation; and
to select the most robust modulation and coding scheme from amongst a plurality of available schemes, and to retransmit the error packet with the scheme selected in this way, when the channel is in an outage situation.

8. Telecommunication system according to claim 6, wherein, if the second signal indicates a defective reception, the transmitter is used to transmit:
some of the redundancy bits eliminated during a puncturing step of the error-correcting code that was used to code the packet during the preceding transmission, if the channel is not in an outage situation;
all of the redundancy bits eliminated during a puncturing step of the error-correcting code that was used to code the packet during the preceding transmission, if the channel is in an outage situation.

9. Receiver for wireless telecommunication system, the receiver including error detection means in order to detect if a packet received from a transmitter contains errors, wherein the receiver further comprises means of outage detection in order to determine, in the event an error packet is detected, if the transmission channel between the transmitter and the receiver is in an outage situation and in order to transmit to the transmitter a first signal (OUTAGE) indicating this situation, said outage condition being established when the instantaneous mutual information is lower than the transmission bit rate, said transmission bit rate being calculated as $$R = \frac{k}{n} \log Q$$

where k and n are respectively the dimension and the length of the error-correcting code coding said data and Q is the degree of the symbol binary modulation used to transmit said data.

10. Receiver according to claim 9, each packet being divided into blocks and each block corresponding to an instance of the channel, the means of outage detection calculate the instantaneous mutual information as the average mutual information on the blocks of a packet.

11. Receiver according to claim 9, wherein the means of outage detection estimate the instantaneous mutual information using:

$$I_{inst} = \frac{\gamma}{n_c} \sum_{i=1}^{n_c} |h_i|^2$$

where $\gamma$ is the signal to noise ratio, $n_c$ the number of blocks in a packet and $h_i$, $i=1, \ldots n_c$ the attenuation coefficients of the transmission channel affecting respectively the blocks of the packet.

12. Receiver according to claim 10, wherein the means of outage detection estimate the instantaneous mutual information using:

$$I_{inst} = \frac{1}{n_c} \sum_{i=1}^{n_c} I_i$$

with $$I_i = \log Q - \frac{1}{Q} \sum_{k=1}^{Q} E_z \left\{ \log \left( \sum_{q=1}^{Q} \exp\left[ -\frac{|h_i a_k + z - h_i a_q|^2 - |z|^2}{2\sigma^2} \right] \right) \right\}$$

where the $\alpha_q = 1, \ldots, Q$ are the symbols of the modulation alphabet, $n_c$ is the number of blocks in a packet, $h_i$, $i=1, \ldots n_c$ are the attenuation coefficients of the transmission channel affecting respectively the blocks of the packet, $z=N(0,\sigma^2)$ the random variable describing the noise and $E_z(.)$ is the expected value over the noise samples.

* * * * *